US012794544B2

(12) United States Patent
Rofougaran et al.

(10) Patent No.: US 12,794,544 B2
(45) Date of Patent: Nov. 10, 2026

(54) WIRELESS COMMUNICATION SYSTEM AND METHOD FOR OPERATING WIRELESS COMMUNICATION SYSTEM AS HIGH-PERFORMANCE WIRELESS BACKHAUL NETWORK

(71) Applicant: Peltbeam Inc., Sherman Oaks, CA (US)

(72) Inventors: Ahmadreza Rofougaran, Newport Beach, CA (US); Mehdi Hatamian, Mission Viejo, CA (US); Shervin Alireza Odabaee, Newport Coast, CA (US); Arman Rofougaran, Newport Beach, CA (US); Puya Rofougaran, Irvine, CA (US)

(73) Assignee: Peltbeam Inc., Sherman Oaks, CA (US)

( * ) Notice: Subject to any disclaimer, the term of this patent is extended or adjusted under 35 U.S.C. 154(b) by 511 days.

(21) Appl. No.: 18/486,612

(22) Filed: Oct. 13, 2023

(65) Prior Publication Data

US 2024/0129022 A1 Apr. 18, 2024

Related U.S. Application Data

(60) Provisional application No. 63/415,678, filed on Oct. 13, 2022.

(51) Int. Cl.

| | |
|---|---|
| ***H04B 7/155*** | (2006.01) |
| ***H04W 8/00*** | (2009.01) |
| ***H04W 28/08*** | (2023.01) |
| *H04W 88/04* | (2009.01) |

(52) U.S. Cl.
CPC .......... *H04B 7/1555* (2013.01); *H04W 8/005* (2013.01); *H04W 28/0983* (2020.05); *H04W 88/04* (2013.01)

(58) Field of Classification Search
CPC .......................... H04B 7/15542; H04W 8/005
See application file for complete search history.

(56) References Cited

U.S. PATENT DOCUMENTS

2008/0045143 A1* 2/2008 Yoshida ................ H04B 7/026 455/7
2023/0067837 A1* 3/2023 Wang .................... H04B 1/005

FOREIGN PATENT DOCUMENTS

CN 106851743 * 12/2016

* cited by examiner

*Primary Examiner* — Sulaiman Nooristany
(74) *Attorney, Agent, or Firm* — CHIP LAW GROUP

(57) ABSTRACT

A wireless communication system includes a plurality of network nodes distributed at different locations in a wireless backhaul network, such as a first network node of the plurality of network nodes that includes an array of antennas and a controller. The controller is configured to configure a first set of antennas to operate within a first frequency range and a second set of antennas to operate in a second frequency range. The controller is further configured to segregate first type of frames from a second type of frames such that the first type of frames are wirelessly relayed from the first network node to one or more other network nodes in a distinct frequency channel within the first frequency range and the second type of frames are wirelessly relayed towards one or more user equipment (UEs) directly or via the one or more other network nodes within the second frequency range.

18 Claims, 7 Drawing Sheets

WIRELESS COMMUNICATION SYSTEM AND METHOD FOR OPERATING WIRELESS COMMUNICATION SYSTEM AS HIGH-PERFORMANCE WIRELESS BACKHAUL NETWORK

REFERENCE

This application makes reference to, claims priority to, and claims benefit from U.S. Provisional Application Ser. No. 63/415,678 filed on Oct. 13, 2022. The above-referenced application is hereby incorporated herein by reference in its entirety.

FIELD OF TECHNOLOGY

Certain embodiments of the disclosure relate to telecommunication systems. More specifically, certain embodiments of the disclosure relate to a wireless communication system and a method for operating the wireless communication system as high-performance wireless backhaul network.

BACKGROUND

Conventionally internet access is provided to end-users by internet service providers (ISP) through an ISP Modem, which provides internet access either via cable connection (e.g., CAT cables), optical fiber, data over cable service interface specification (DOCSIS), or even by using satellite customer premises equipment (CPE) by mobile network operators, such as for fifth generation (5G) mm-wave technology, and the like. In certain embodiments, the ISP modem establishes a communication link to the internet through above mentioned methods, and then the internet access is provided to end-users through a local area network (LAN) connection. Conventionally, the LAN connection is connected to the ISP modem through a router, which manages different communication protocols to facilitate the internet access. However, the conventional routers are ineffective and inefficient to extend network coverage and are unable to meet the future demands, which require improved network coverage. In certain scenarios, networks are deployed as a hybrid network, such as through a combination of a wired system and a wireless system, such as to meet the future demands of network coverage. However, it is technically challenging with such hybrid systems to add new access points. For instance, when a new access point is added to a Network Backhaul, a Wi-Fi mesh extender domain is created, which means that the new access point may behave as a mesh extender without proper configuration. These mesh extender domains interfere with each other. This interference could result in degraded performance, dropped connections, or other issues like undesirable reduction in throughput and aggravation of latency within the network referred to as Mesh Domain Collision. The addition of a new access point as a Wi-Fi® relay node, forming a mesh network, may introduce more limitations than solutions. While Wi-Fi mesh is designed for expanded coverage, it often leads to significant bandwidth and latency penalties, particularly as the number of nodes increases. This approach can be seen as a patchwork solution, lacking a comprehensive resolution and potentially diminishing the overall health of the network system. Furthermore, legacy Wi-Fi clients often still participate in a Wi-Fi® network, in which RTS/CTS (Request to Send/Clear to Send) protection mechanisms are needed. This further contributes to the inefficiency and latency.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY OF THE DISCLOSURE

A wireless communication system and a method for operating the wireless communication system as high-performance wireless backhaul network, where the wireless communication system includes a plurality of network nodes distributed at different locations in the wireless backhaul network, substantially as shown in and/or described in connection with at least one of the figures, as set forth more completely in the claims.

These and other advantages, aspects, and novel features of the present disclosure, as well as details of an illustrated embodiment thereof, will be more fully understood from the following description and drawings.

DETAILED DESCRIPTION OF THE DISCLOSURE

Certain embodiments of the disclosure may be found in a wireless communication system that includes a plurality of network nodes distributed at different locations in a wireless backhaul network. Certain embodiments of the disclosure further provide a method for operating the wireless communication system as high-performance wireless backhaul network. Unlike the conventional wired, hybrid, or wireless systems, the wireless communication system of the present disclosure transmits data over distinct frequency channels to avoid contention and collision between different network nodes, or collision due to the presence of new user equipment. The wireless communication system of the present disclosure removes air collisions by controlling each network node to allocate different frames on different antennas based on different frequencies. The wireless communication system effectively manages and avoids collisions in the wireless communication system, decreases latency and provides improved throughput. The disclosed wireless communication system provides a new network topology by replacing conventional routers and by replacing all the backbone wires or Ethernet cables with wireless backhaul network (e.g., mmWave backhaul network) to connect and manage all of the plurality of network nodes and wireless access points with reduced cost and reduced network complexity. In the following description, reference is made to the accompanying drawings, which form a part hereof, and in which are shown, by way of illustration, various embodiments of the present disclosure.

Figure 1:
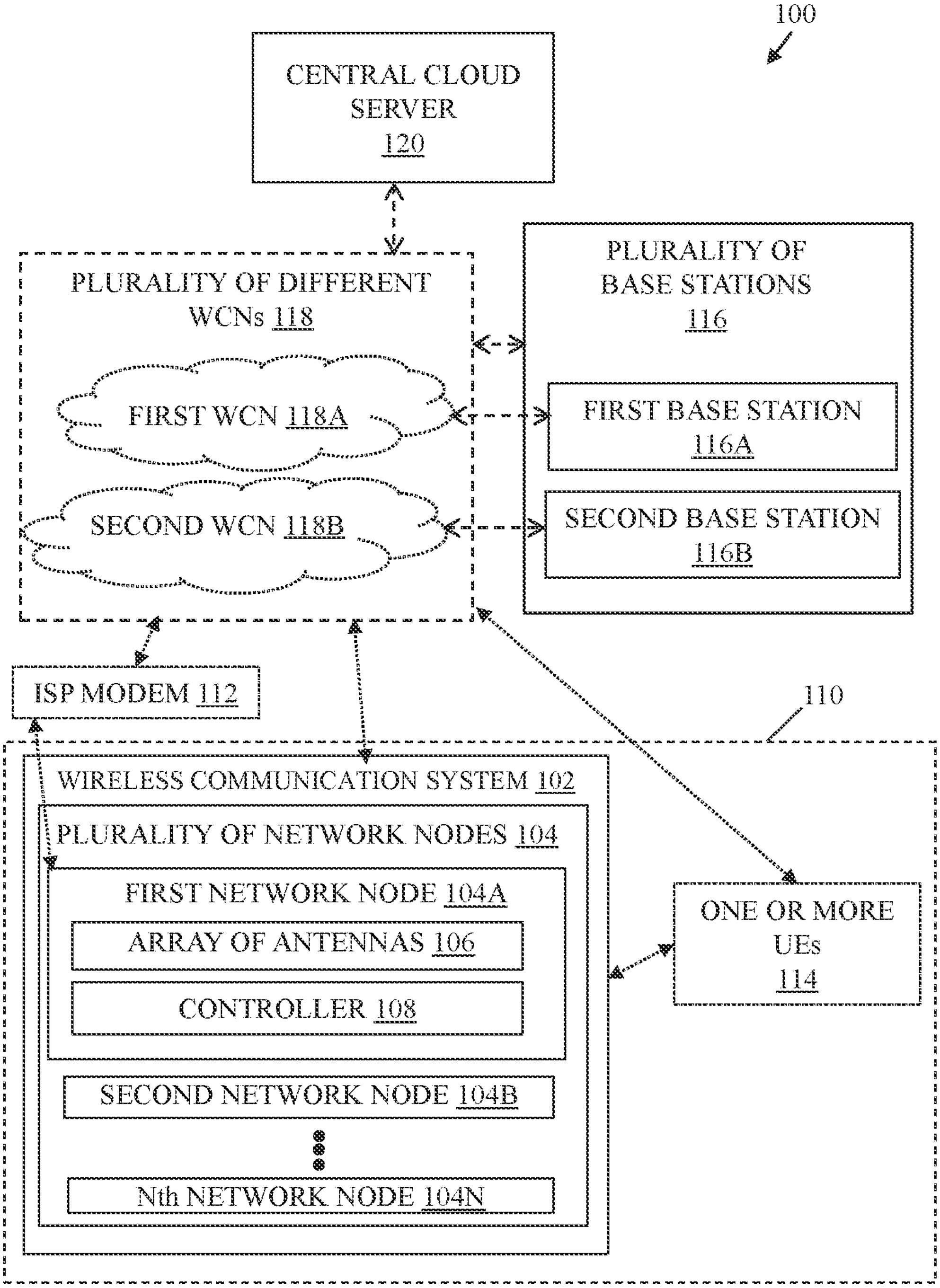
FIG. 1 is a diagram illustrating a network environment of an exemplary wireless communication system, in accordance with an exemplary embodiment of the disclosure.

FIG. 1 is a diagram illustrating a network environment of an exemplary wireless communication system, in accordance with an exemplary embodiment of the disclosure. With reference to FIG. 1, there is shown a network environment 100 of a wireless communication system 102. The wireless communication system 102 may include a plurality of network nodes 104, such as a first network node 104A, a second network node 104B, and up to an Nth network node 104N, which may be distributed in a wireless backhaul network 110. The first network node 104A may include an array of antennas 106 and a controller 108. The array of antennas 106 may include N-number of antennas or N-sets of antennas. There is further shown one or more user equipment (UEs) 114, a plurality of base stations 116 (e.g., a first base station 116A and a second base station 116B), a plurality of different wireless carrier networks (WCNs) 118 (e.g., a first WCN 118A and a second WCN 118B), and a central cloud server 120. In an implementation, the wireless communication system 102 may be communicatively coupled to the central cloud server 120.

In accordance with an embodiment, the wireless backhaul network 110 may comprise the plurality of network nodes 104. In an implementation, the wireless communication from each network node to its respective UEs, such as the one or more UEs 114 may be in different frequencies, for example in industrial, Scientific and Medical (ISM) band. However, the communication between each network node (i.e., inter node communication) may be in a mmWave spectrum, which may form a wireless mmWave backhaul in the wireless backhaul network 110. The motivation to perform transmit/receive on non-ISM band may be to make a static and permanent wireless Backhaul connection which is not subjected to dynamic changes by Wi-Fi protocol requirements, for example, changes in Modulation and Coding Scheme (MCS) data transfer rates. This enables the wireless communication system 102 to keep the wireless Backhaul (i.e., network node to network node communication) fixed and undisturbed.

In an implementation, the wireless backhaul network 110 may comprise the plurality of network nodes 104 as a distinct network loop isolated from other network traffic corresponding to fronthaul access. Consequently, such configuration may not introduce any additional collision domains to the wireless backhaul network 110. Furthermore, by virtue of maintaining a distinct network loop, the wireless backhaul network 110 may be less prone to interference or congestion from the fronthaul traffic. Therefore, such separation ensures that the wireless backhaul network 110 can operate with minimal disruptions, leading to improved reliability and performance.

In an implementation, the wireless communication system 102 may be configured to circumvent the limitations imposed by conventional communication systems. For instance, in the wireless communication system 102, each network node may transmit data to another network node over a distinct frequency channel to avoid contention and collision between different network nodes of the plurality of network nodes 104. For example, the first network node 104A may communicate to the second network node 104B over a frequency channel, say frequency channel 149, and the second network node 1048 may communicate with a third network node over another frequency channel, say frequency channel 153, and the like.

In an implementation, the first network node 104A may be communicatively coupled to an internet service provider (ISP) modem 112. In another implementation, the first network node 104A may be configured to communicate with a radio access network (RAN) node, such as a first base station 116A or a second base station 1168. The plurality of network nodes 104 may be distributed at different locations in the wireless backhaul network 110 so that the wireless communication system 102 may expand its coverage without adding any penalties to data throughput and latency with each new addition of network node. In an example, the wireless backhaul network 110 can achieve multigigabit data throughput rate, for example, 2.5 Gbit/s, 5 Gbit/s, and even more than 10 Giga bits/second depending on number of UEs to be served. The first network node 104A may be a master access point or a master network node and the remaining network nodes of the plurality of network nodes 104 may be slave network nodes. The first network node 104A (from master access point's (AP's) perspective) may be responsible for downloading and uploading frames, for example, with the ISP modem 112. In an implementation, the download frequency may be dedicated, isolated and configured to not allow air collision, because no other network device may operate at that specific download frequency. When the master AP (i.e., the first network node 104A) may be transmitting, all other slave APs (other network nodes) may listen in that frequency. Alternatively, when slave APs want to upload to the master AP (i.e., the first network node 104A), each slave AP may be assigned to a time slot to transmit to the master AP. This method ensures each slave AP (i.e., the save network node) only transmits to a predefined time slot to avoid contention and collision with another slave AP.

Examples of implementation of each network node of the plurality of network nodes 104, such as the first network node 104A, the second network node 104B, and up-to the Nth network node 104N may include, but is not limited to, a network device, a repeater device, a relay device, a wireless access point, a mesh network node, or a combination thereof. Each network node may be strategically deployed to meet specific network requirements, which ensure that each network node is tailored to optimize performance, coverage, and functionality, making each network node highly adaptable to various use cases and evolving network needs. Furthermore, the first network node 104A may include the array of antennas 106 and the controller 108. Similarly, each network node from the plurality of network nodes 104 may also include the array of antennas and controller similar to that of the first network node 104A. Furthermore, each antenna of the array of antennas 106 may be an antenna that may operate in one or more of: a C-band, FR1 band of 5G NR, FR2 band of 5G NR, LTE band, and the like. In an implementation, each antenna of the array of antennas 106 may be a patch antenna. In an implementation, each antenna from the array of antennas 106 may be a phase-array antenna, an individual antenna, or other types of C-band antenna. Furthermore, examples of the controller 108 may include, but are not limited, to a digital signal processor (DSP), a central processing unit (CPU), a field programmable gate array (FPGA), a combination of CPU and FPGA, or other control circuitry.

Each of the one or more UEs 114 may correspond to a telecommunication hardware used by an end-user to communicate. Alternatively stated, the one or more UEs 114 may refer to a combination of a mobile equipment and subscriber identity module (SIM). Each of the one or more UEs 114 may be subscriber of at least one of the plurality of different WCNs 118. Examples of the one or more UEs 114 may include, but are not limited to, a smartphone, a virtual reality headset, an augmented reality device, a wireless modem, a customer-premises equipment (CPE), a home router, a cable or satellite television set-top box, a VoIP station, or any other customized hardware for telecommunication.

Each of the plurality of base stations 116 may be a fixed point of communication that may communicate information, in form of a plurality of beams of RF signals, to and from communication devices, such as the wireless communication system 102 and the one or more UEs 114. Multiple base stations corresponding to one service provider, may be geographically positioned to cover specific geographical areas. Typically, bandwidth requirements serve as a guideline for a location of a base station based on relative distance between the UEs and the base station. The count of base stations depends on population density and geographic irregularities, such as buildings and mountain ranges, which may interfere with the plurality of beams of RF signals. In an implementation, each of the plurality of base stations 116 may be a gNB. In another implementation, the plurality of base stations 116 may include eNBs, Master eNBs (MeNBs) (for non-standalone mode), and gNBs.

Each of the plurality of different WCNs 118 may be owned, managed, or associated with a mobile network operator (MNO), also referred to as a mobile carrier, a cellular company, or a wireless service provider that provides services, such as voice, SMS, MMS, Web access, data services, and the like, to its subscribers, over a licensed radio spectrum. Each of the plurality of different WCNs 118 may own or control elements of a network infrastructure to provide services to its subscribers over the licensed spectrum, for example, 4G LTE, or 5G spectrum (FR1 or FR2). For example, the first base station 116A may be controlled, managed, or associated with the first WCN 118A, and the second base station 116B may be controlled, managed, or associated with the second WCN 118B different from the first WCN 118A. The plurality of different WCNs 118 may also include mobile virtual network operators (MVNO).

The central cloud server 120 includes suitable logic, circuitry, and interfaces that may be configured to communicate with the wireless communication system 102 and/or the plurality of base stations 116. In an example, the central cloud server 120 may be a remote management server that is managed by a third party different from the service providers associated with the plurality of different WCNs 118. In another example, the central cloud server 120 may be a remote management server or a data center that is managed by a third party, or jointly managed, or managed in coordination and association with one or more of the plurality of different WCNs 118. In an implementation, the central cloud server 120 may be a master cloud server or a master machine that is a part of a data center that controls an array of other cloud servers communicatively coupled to it, for load balancing, running customized applications, and efficient data management.

In accordance with an embodiment, the wireless backhaul network 110 may comprise the plurality of network nodes 104 that operates in a millimeter wave (mmWave) spectrum and the controller 108 may be configured to establish a concurrent bidirectional communication with the one or more other network nodes for inter-node communication through one or more backhaul links with the one or more other network nodes. The mmWave spectrum enables transmission of large volumes of data at high speeds for inter-node communication. Furthermore, the mmWave spectrum communication has an inherent capability of increased available bandwidth for the plurality of network nodes 104 as compared to lower-frequency bands, which reduces the likelihood of network congestion. In addition, the use of the mmWave spectrum and the concurrent bidirectional communication may be used to minimize latency in the wireless backhaul network 110, which is beneficial for various applications that require real-time data transmission, such as online gaming, telemedicine, and AI-based applications or IoT network operations. Furthermore, the concurrent bidirectional communication with the one or more other network nodes for inter-node communication through the one or more backhaul links may be advantageous for applications that require rapid data transfer, such as 5G networks and high-definition video streaming.

In accordance with an embodiment, the wireless backhaul network 110 may comprise the plurality of network nodes 104 as a distinct network loop isolated from other network traffic corresponding to fronthaul access. In an implementation, the isolated wireless backhaul network (i.e., the wireless backhaul network 110) may be scaled independently of the fronthaul access network, due to which the wireless backhaul network 110 can be expanded without impacting the fronthaul access or vice versa. By virtue of isolating the wireless backhaul network 110 from the fronthaul access network, the plurality of network nodes 104 may not interfere with or compete for resources with the traffic used for the fronthaul access, due to which no new collision domain is introduced to the wireless backhaul network 110. Furthermore, the wireless backhaul network 110 may comprise the distinct network loop with improved security, which is beneficial to avoid unauthorized users or malicious factors to access or interfere with the plurality of network nodes 104, protecting sensitive data and network integrity.

Typically, conventional communication networks (e.g., wired networks) are inefficient to adapt to changes with the passage of time, due to which are unable to provide coverage to new physical areas. The conventional communication networks are required to install special cables (e.g., CAT 6) within buildings and the issue is that as technology changes, such cables may not be suitable to meet future requirements, so are generally required to be replaced, which is time consuming and costly. In addition, the conventional communication networks are inefficient to cover additional areas without adding cables, which is not desirable.

The wireless communication system 102 of the present disclosure may be configured to circumvent the limitations imposed by conventional communication systems. The wireless communication system 102 of the present disclosure removes air collisions by controlling each network node to allocate different frames on different antennas based on different frequencies. Thus, the wireless communication system 102 may manage and avoid collisions in a wireless system, decrease latency and provide improved throughput. The wireless communication system 102 provides a new network topology by replacing conventional routers and by replacing all the backbone wires with a wireless mmWave backhaul network to connect and manage all of the plurality of network nodes 104 (e.g., wireless access points or relays) with reduced cost and reduced network complexity.

Figure 2A:
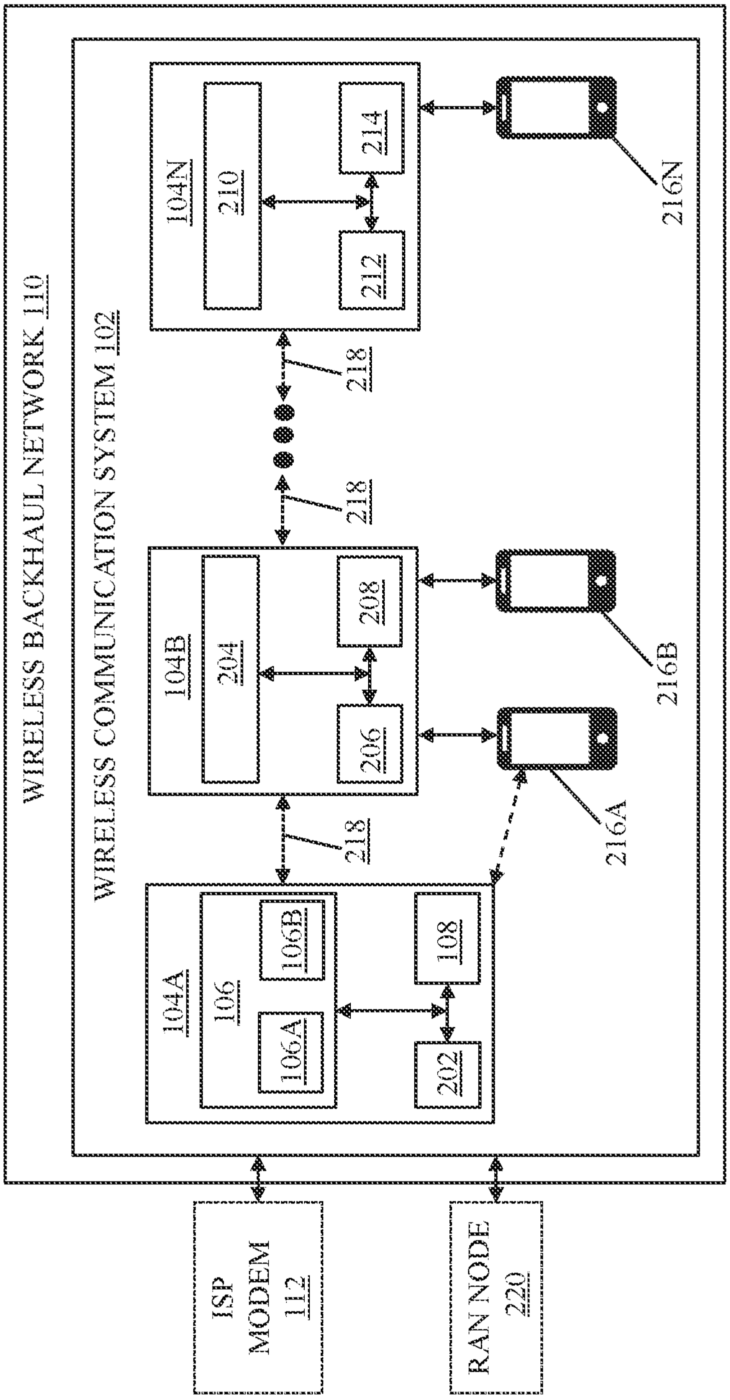
FIG. 2A is a block diagram illustrating a wireless communication system with a plurality of network nodes, in accordance with an exemplary embodiment of the disclosure.

FIG. 2A is a block diagram illustrating a wireless communication system with a plurality of network nodes, in accordance with an exemplary embodiment of the disclosure. FIG. 2A is explained in conjunction with elements from FIG. 1. With reference to FIG. 2A, there is shown the wireless communication system 102 that includes the first network node 104A, the second network node 104B, and up-to the Nth Network node 104N. The first network node 104A may include the array of antennas 106, the controller 108, and a memory 202. Similarly, the second network node 104B includes a corresponding array of antennas 204, memory 206, and controller 208. Similarly, the Nth network node 104N includes Nth array of antennas 210, Nth memory 212, and Nth controller 214. The second network node 104B may serve a first user equipment (UE) 216A and a second UE 216B. Similarly, the Nth network node 104N may serve an Nth UE 216N. There is further shown one or more backhaul links, such as the backhaul links 218, between the first network node 104A, the second network node 104B, and the Nth network node 104N, such as backhaul links 218 are used for inter-node communication. There is further shown a radio access network (RAN) node 220 and the ISP modem 112.

In operation, the controller 108 of the first network node 104A may be configured to execute a discovery operation to identify the one or more network nodes from the plurality of network nodes 104. In the discovery process, the controller 108 may be configured to cause each network node to determine location information of a plurality of neighboring network nodes around each network node of the plurality of network nodes 104. The plurality of neighboring nodes may comprise two or more neighboring network nodes of the plurality of network nodes 104. Alternatively stated, the discovery operation or process may comprise determining location information of a plurality of neighboring network nodes. For example, the first network node 104A may determine its location and also the location of the neighboring nodes, such as other nearby network nodes 1048 and 104N. In some implementations, each network node of the plurality of network nodes 104 may further comprise a position sensor (e.g., a gyroscope) or a location sensor (e.g., a global positioning system (GPS) sensor or other geospatial location sensor). In such a case, each network node may determine its location coordinates by use of the position or the location sensor. For example, each network node may utilize the position sensor and/or the location sensor for localization (i.e., to determine its location coordinates). In another example, in indoor deployment, each network node may further include Wi-Fi® capability, which may be used, for example, to determine its location coordinates or location coordinates of neighboring network nodes (e.g., nearby network nodes implemented as mesh nodes) by indoor received signal strength indication (RSSI)-based triangulation or WI-FI®-based triangulation process, known in the art.

In another exemplary implementation, at the time of deployment of the plurality of network nodes 104, a location of each of the plurality of network nodes 104 may be uploaded to the central cloud server 120 along with an identity of the corresponding network node. The location coordinates may be determined by any other known methods of location estimation, such as a triangulation method, using sounding waves, using sensors, a Radar provided in one or more network nodes, BLUETOOTH™, RSSI from client etc. The discovery of location of each network node of the plurality of network nodes 104 (i.e., mesh nodes) may be done by any methods known in the art.

In an implementation, the plurality of network nodes 104 may be deployed strategically at different locations to increase coverage and overcome signal blockage so that RF signals can reach a location previously not reachable. For example, at nooks and corners of a building of an enterprise, behind a building, inside the building at different locations to overcome blockages. In an example, the plurality of network nodes 104 may be deployed as a private mesh network created for an enterprise. The plurality of network nodes 104 may form a wireless mesh network or a wireless chain network by establishing backhaul links with each other in a mesh network configuration or a chain network configuration. In the mesh network configuration, each network node may be communicatively coupled to at least two to three neighboring network nodes. In the chain network configuration, each network node is connected to another network node in a sequence, as shown for example, in FIGS. 2A and 2B. In this case, once the discovery operation is performed, then the first network node 104A may establish a connection with the one or more network nodes from the plurality of network nodes 104, such as the second network node 104B, and up-to the nth Network node 104N through the one or more backhaul links 218, which results in the formation of the wireless backhaul network 110.

In accordance with an embodiment, once the discovery is performed, then at least one network node of the plurality of network nodes 104 may act as a master network node and other network nodes from the plurality of network nodes 104 may act as slave network nodes controlled by the master network node. For example, the first network node 104A may be configured to act as the master network node and may be connected to the wireless backhaul network 110. Moreover, one or more network nodes, such as the second network node 104B, up-to the Nth network node 104N may act as slave network nodes, which may be controlled by the first network node 104A. In other words, the first network node 104A may be configured for transmitting data from the ISP modem 112 or the RAN node 220 towards the one or more network nodes of the plurality of network nodes 104 through the backhaul links 218 and further receiving user data or request from any of the network nodes to communicate further with upstream, such as the ISP modem 112 or the RAN node 220.

In accordance with an embodiment, the controller 108 may be configured to receive one or more signals from the ISP modem 112 (e.g., a radio modem). In an example, the ISP modem 112 may be referred to as a gateway between a subscriber's local network and the wider internet, converting digital data from the subscriber's network into a form suitable for transmission over the ISP's network infrastructure and vice versa. In another implementation, instead of the ISP modem 112, the controller 108 may be configured to directly receive radio frequency (RF) signals from the RAN node 220 (e.g., a small cell or a gNB), such as from the first base station 116A or from the second base station 116B (of FIG. 1) for the Internet access. The RF signals may be in frequency band like FR1 or FR2 5G New Radio (NR). Moreover, the RF signals may include the management frames, the control frames, and the data frames.

The controller 108 of the first network node 104A may be configured to configure a first set of antennas 106A of the array of antennas 106 to operate within a first frequency range and a second set of antennas 106B of the array of antennas 106 to operate in a second frequency range. The second frequency range may be higher than the first frequency range. In other words, the first network node 104A may be configured to configure the first set of antennas 106A and the second set of antennas 106B of the array of antennas 106 and assigns a dedicated frequency in transmission (Tx) and reception (Rx) direction. In an implementation, the array of antennas 106 may include sixteen number of antennas and the first network node 104A is configured to Transmit (Tx) and Receive (Rx) with all of the sixteen number of antennas. Optionally, all of the sixteen number of antennas can be assigned to 5 GHz, 6 GHz or 2.4 GHz and can transmit concurrently. In an implementation, the first set of antennas 106A may be configured by the controller 108 to operate within the first frequency range, up to sub-6 GHz, such as 2.4 gigahertz (GHz), 5 GHz, or at 6 GHz. Similarly, the second set of antennas 106B may be configured by the controller 108 to operate in the second frequency range, such as above sub-6 GHZ at high frequency millimeter wave (e.g., at 60 GHz, 61 GHz, FR1 or FR2 5G NR frequency bands and the like). As a result, the second set of antennas 106B may operate at higher frequency range as compared to the frequency range of the first set of antennas 106A. In addition, the second set of antennas 106B may operate at higher frequency millimeter wave bands, which can provide improved data transfer rates and reduced interference, enhancing overall performance of the first network node 104A. Furthermore, the first network node 104A may support compatibility with various frequency-dependent devices, including the operating at 2.4 GHz, 5 GHz, and 6 GHz, as well as the high-frequency millimeter-wave devices at 60 GHz and 61 GHz, facilitating seamless connectivity across a wide range of devices. Furthermore, the wireless communication system 102 may allow for the simultaneous operation of the first set of antennas 106A and the second set of antennas 106B at different frequency ranges, offering flexibility for diverse wireless communication scenarios.

The controller 108 of the first network node 104A may be configured to segregate a first type of frames from a second type of frames such that the first type of frames are wirelessly relayed from the first network node 104A to one or more other network nodes 104B and 104N of the plurality of network nodes 104 in a distinct frequency channel within the first frequency range and the second type of frames are wirelessly relayed towards one or more UEs 216A, 216B, or 216N directly or via the one or more other network nodes 104B and 104N within the second frequency range. The first type of frames may comprise management frames or control frames and the second type of frame may comprise user data frames. For example, tailored to specific application needs, the Backhaul may be configured to operate at a 60 GHz unlicensed mmWave Line of Sight (LOS) configuration, ensuring minimal latency and optimal throughput. To mitigate collisions that could disrupt data transfer, the management and/or control frames may be distinctly separated from the data frames. This may be achieved by allocating the management and control frames to lower frequency channels, while the data frames may be assigned to higher frequency channels, enhancing the efficiency and reliability of the overall communication system.

In an example, it is observed that approximately sixty percent of the one or more signals generally include the control frames and fifteen percent may be the management frames. Therefore, the control frames and management frames (i.e., the first type of frames) may collectively consume almost seventy five percent of the usable airtime, while only twenty five percent of the one or more signals may be used by the data frames (i.e., the second type of frames). The wireless communication system 102 exploits this fact to intelligently leverage and improve performance of the wireless network.

It is known that typically the management frames may be used to establish and manage a basic service set (BSS), perform authentication, association, and disassociation, and announce network parameters, such as a service set identifier (SSID) and corresponding capabilities. In an example, the management frames may be used for robing, associating, roaming, and disconnecting clients from the wireless backhaul network 110. The management frames may be used for connecting the first network node 104A with the wireless backhaul network 110. Similarly, the control frames may be used to control access to the wireless backhaul network 110, such as for frame acknowledgement or power management. In an example, the control frames only include a header and trailer, and may not include a body. Similarly, the data frames include user data, such as web pages, emails, or video streams, or user content and may be responsible for the to-and-fro communication with the UEs in the wireless backhaul network 110.

Furthermore, by virtue of segregating the first type of frames from the second type of frames, the control or management type of information (i.e., within the first type of frames) can be transmitted efficiently without being bogged down by the second type of frames and vice-versa, which results in reduced latency and improved overall network performance. In addition, the first type of frames may be wirelessly relayed from the first network node 104A to one or more other network nodes of the plurality of network nodes 104 in a distinct frequency channel within the first frequency range. For example, the first type of frames may be wirelessly relayed by the first set of antennas 106A towards the second network node 104B in the distinct frequency channel within the first frequency range. In an implementation, the first type of frames may be wirelessly relayed through the one or more backhaul links 218.

In an implementation, the routing of management frames and control frames may be performed in two different directions using the array of antennas 106. For example, the management frames may be relayed in a first direction while the control frame from the first type of frames may be relayed in a second direction, which is different from the first direction to avoid interference. Frames (such as Beacon frames) may be dispersed in multiple directions, while TDMA schedules the management of such frames. In an implementation, the first type of frames may be wirelessly relayed using a single antenna from the first set of antennas 106A towards the second network node 104B. In such a case, the controller 108 may be further configured to modulate and schedule the first type of frames using time division multiple access (TDMA). Thereafter, the management frames as well as the control frames from the first type of frames may be wirelessly relayed from the first network node 104A to one or more other network nodes of the plurality of network nodes 104 in the distinct frequency channel within the first frequency range of the first set of antennas 106A. In an example, when a single antenna is used, then the controller 108 may be further configured to modulate and schedule the management frames using the TDMA while the control frames may be modulated and scheduled using orthogonal frequency-division multiplexing (OFDM), such as to provide multiple access capabilities. Furthermore, the controller 108 of the first network node 104A can use one or more antennas from the array of antennas 106 to provide different throughput selection and for providing access to the first network node 104A (master AP).

The second type of frames are wirelessly relayed from the first network node 104A towards one or more user equipment (UEs) directly or via the one or more other network nodes within the second frequency range. For example, the second type of frames may be wirelessly relayed within the second frequency range and through the second set of antennas 106B towards the first UE 216A either directly or via the second network node 104B, as shown in FIG. 2A. In an implementation, the second type of frames may be wirelessly relayed within the second frequency range and through the second set of antennas 106B towards the first UE 216A. In another implementation, the second type of frames may be wirelessly relayed within the second frequency range and through the second set of antennas 106B towards the second network node 104B and then from the second network node 104B towards the second UE 216B. As a result, the management frames or the control frames may be relayed separately from the data frames to minimize collisions causing disruption due to transfer of flow from the first set of antennas 106A and the second set of antennas 106B at different frequency ranges. By virtue of configuring the first network node 104A to distribute the first type of frames and the second type of frames across by using the first frequency range and the second frequency range, the controller 108 may eliminate the possibility of air collisions. In addition, the controller 108 may be beneficial to effectively manage and prevent collisions within the wireless communication system 102 while significantly reducing latency and improving throughput.

In accordance with an embodiment, the controller 108 may be further configured to receive a request from a new UE to join the wireless backhaul network 110. Thereafter, in response to the request, the controller 108 may be configured to transmit a beacon signal to the new UE from one or more antennas of the first set of antennas 106A configured to operate in the first frequency range. In an implementation, when the new UE is trying to join the wireless backhaul network 110, then the controller 108 may configured to utilize the lower frequency channels to transmit the beacon signal from the first network node 104A to the new UE. Thereafter, the new UE may transmit the device data back to the first network node 104A. In an example, the beacon signal may be transmitted in a separate collision domain, which is different from inter-node communication. In addition, the controller 108 may be further configured to authenticate the request and establish a priority profile of the new UE based on device data received from the new UE in response to the transmitted beacon signal. In other words, the controller 108 is configured to check whether the device data is valid to authenticate the request and establish the priority profile of the new UE based on device data received from the new UE. Beneficially as compared to conventional approaches, the controller 108 of the first network node 104A ensures seamless and disruption-free communication within the wireless backhaul network 110, especially for new UE connections, by allocating lower frequency channels for initial synchronization and data transfer scheduling. This significantly reduces the potential for contention and collisions, improving overall network reliability and performance.

In accordance with an embodiment, the controller 108 may be further configured to increase a data throughput from a first level to a second level to the new UE and schedule a communication timeslot to the new UE based on the authentication and establishment of the priority profile. In an implementation, once the new UE is qualified by the first network node 104A at a lower frequency and a priority profile is established, then the first network node 104A may intelligently determine to increase the level of data throughput, such as from the first level (e.g., 10-50 MB/s) to the second level (100 MB/s up to multigigabit per second). The controller 108 may be further configured to schedule a communication timeslot, due to which the first network node 104A and the new UE can schedule and expect a synchronized data transfer window to avoid contention and collision.

In an example, once the first network node 104A (i.e., the master AP) completes the discovery and authentication process, establishing communication, the first network node 104A (i.e., the master AP) may configure its antennas and assigns them to a dedicated frequency in both transmit and receive directions, optimizing performance for the given scenario. Post-authentication, the first network node 104A (i.e., the master AP) may facilitate Multi-User access and may schedule communication using a combination of time and frequency, leveraging a best-selected antenna. For instance, when faced with 10 user devices, a given network node 104A (i.e., the master AP) may communicate independently with each user device by employing Time Division Multiple Access (TDMA) or Orthogonal Frequency Division Multiple Access (OFDMA) based on individual device profiles. Each network node may function as a switch at Layer 2, dispersing signals in specific directions, while simultaneously handling IP (Layer 3) routing for data received from the ISP modem 112. Scheduling frames through Multilink OFDM in both Uplink and Downlink directions helps mitigate air collisions, as each network node may allocate different frames on distinct antennas using varying frequencies. This collision management strategy reduces latency and significantly increases overall throughput in the wireless communication system 102.

In accordance with an embodiment, the relay of the first type of frames and the second type of frames from the first network node 104A to the one or more other network nodes of the plurality of network nodes 104 may be in the chain network configuration or the mesh network configuration. The chain network or the mesh network setup may provide increased flexibility and scalability within the wireless backhaul network 110. Furthermore, the chain network configuration or the mesh network configuration may allow an efficient relay of both the first type of frames and the second type of frames, promoting robust communication and adaptability to various network topologies and deployment scenarios. The chain network configuration or the mesh network configuration can distribute network traffic and relay tasks across multiple nodes, preventing congestion and optimizing network performance. In an implementation, the mesh network configuration can adapt dynamically to changes in network conditions, such as node failures or signal interference, by rerouting data along the most efficient path, which is beneficial to prevent congestion and optimizing network performance.

In an implementation, in scenarios of unforeseen communication interruptions to ensure continuous communication between all network nodes of the plurality of network nodes 104 and the one or more UEs 114, data prioritization for transmission priority allocation may be executed. In this case, depending on the priority of data, low priority data frames may be relayed on the distinct lower frequency channels within the first frequency range. Similarly, high priority data frames may utilize higher frequency channels within the second frequency range. Furthermore, the controller 108 may be configured to have the lower frequency channels available within the first frequency range as a backup. Therefore, in case of certain disruption in high frequency channels, the low frequency channels can sustain communication while the problem in higher channels is getting resolved. Therefore, the controller 108 of the first network node 104A may be beneficial to provide a continuous communication between the plurality of network nodes 104. In addition, the continuous communication between the plurality of network nodes 104 at lower frequency channels may be a better option as compared to no communication at all. In addition, the lower frequency channels may also be used to authenticate different users and take profile information from each user to provide to the first network node 104A. Furthermore, the lower frequency channels may be used by the first network node 104A to configure the one or more network nodes of the plurality of network nodes 104. The lower frequency channels may provide a wider network area so that the first network node 104A may be in proximity to the one or more network nodes of the plurality of network nodes 104.

In accordance with an embodiment, when the first network node 104A is the master network node, the controller 108 may be further configured to assign a distinct frequency and a distinct time slot to each slave network node for uplink transmission towards the first network node 104A through one or more backhaul links. In an example, the controller 108 of the first network node 104A may be configured to perform the TDM and OFDM to assign a distinct frequency and a distinct time slot to each slave network node for uplink transmission. By virtue of assigning distinct frequencies to each slave network node, the controller 108 may minimize interference between different slave network nodes. As a result, each slave network node can communicate with the first network node 104A simultaneously without causing interference, leading to improved network reliability and performance.

In accordance with an embodiment, the controller 108 may be further configured to schedule a concurrent uplink transmission and downlink transmission with the slave network nodes through the one or more backhaul links 218 based on the assignment of the distinct frequency and the distinct time slot to each slave network node. In an example, the controller 108 of the first network node 104A may be further configured to schedule the concurrent uplink transmission and the downlink transmission based on the TDM and OFDM to assign a distinct frequency and a distinct time slot to each slave network node for uplink transmission. Herein, the multilink OFDM enables the first network node 104A to communicate with one or more network nodes of the plurality of network nodes 104, such as by controlling the array of antennas 106 for utilizing three different frequencies for intra-network node communication, as shown and described in detail, for example, in FIG. 2B. By virtue of using the Multilink OFDM, the first network node 104A may extend the range and accelerate the performance of the wireless backhaul network 110, potentially achieving speeds akin to a 2.5 or 5 Gbit/s ethernet connection with low latency and improved throughput. In an implementation, once the second type of frames are wirelessly relayed towards the second network node 104B, thereafter the second network node 104B may be configured to perform beamforming, such as to focus a mmWave signal in a specific direction through the corresponding array of antennas 204. For example, towards a subsequent network node, towards the first UE 216A or towards the second UE 216B, which may improve the range and performance of the wireless backhaul network 110. In an example, the controller 208 of the second network node 104B may be further configured to execute one or more computer executable instructions, which are stored in the other memory 206, such as to control various operation of the second network node 104B. In an implementation, the Nth network node 104N may also be configured to perform beamforming, such as to focus a mmWave signal in a specific direction through the Nth array of antennas 210. For example, towards the Nth UE 216N, which improves the range and performance of the wireless backhaul network 110. In an example, the Nth controller 214 may be further configured to execute one or more computer executable instructions, which are stored in the Nth memory 212, such as to control various operation of the Nth network node 104N.

In accordance with an embodiment, the synergy of mmWave communication and beamforming may be used that may be highly effective in channel separation, leveraging dual polarization. Dual-pole antennas may efficiently double data rates, enabling each network node to communicate, for example, at 320 MHz on each polarized antenna. While these dual-pole antennas operate at lower frequencies, the signal may undergo up-conversion and propagation at 60 GHz mmWave, employing the array of antennas 106. Specifically, in an implementation, Phase Array Antennas (PAAs) with 8, 16, or 32 dual-pole Arrays may be utilized to transmit and receive high-frequency mmWave signals. The PAA may align electromagnetic signals into a narrow beam, directing it precisely to a specific spot or area, enhancing the overall performance and focus of wireless communication.

In accordance with an embodiment, the controller 108 may be further configured to execute an on-demand load balancing by causing the second network node 104B to direct one or more focused beams of radio frequency (RF) signals including a first data throughput capacity to a crowded area including a first set of UEs, such as the first UE 216A and the second UE 216B. The controller 108 may further cause a third network node (e.g., the Nth network node 104N) to direct one or more wide beams of the RF signals including a second data throughput capacity to a less-crowded area including a second set of UEs that are less than the first set of UEs. Here, the second data throughput capacity is less than the first data throughput capacity. This dynamic load balancing strategy optimizes network resources by efficiently allocating higher data throughput where required, ensuring that crowded areas receive ample bandwidth while conserving resources in less-crowded areas, ultimately enhancing network performance and user satisfaction.

In accordance with an embodiment, the controller 108 may be configured to execute an on-demand load balancing by causing the second network node 104B (from its first side) to direct one or more focused beams of the RF signals including the first data throughput capacity to the crowded area including the first set of UEs. The controller 108 may further cause the same network node, i.e., the second network node 104B (from its second side) to direct a wide beam of the RF signals including the second data throughput capacity to the less-crowded area including the second set of UEs that are less than the first set of UEs. Herein, the second data throughput capacity may be less than the first data throughput capacity. By virtue of directing the one or more beams of the RF signals with varying data throughput capacities, the controller 108 can intelligently allocate network resources. In crowded areas with a high concentration of the first set of UEs, the second network node 104B directs the one or more focused beams of the RF signals to ensure that each UE from the first set of UEs experience optimal data speeds and improved network performance at improved throughput. Conversely, in the less-crowded areas with less number UEs (i.e., the second set of UEs), the use of the wider beams with a lower data throughput capacity may ensure that network resources are not wasted, thereby conserving bandwidth and increasing overall network efficiency. This on-demand load balancing approach may lead to improved user experiences in crowded areas and resource optimization in less-crowded zones, enhancing network performance overall.

In accordance with an embodiment, the controller 108 may be further configured to direct one or more focused beams of radio frequency (RF) signals including the first data throughput capacity to the crowded area including the first set of UEs. The controller 108 may be configured to direct the wide beam of RF signals including the second data throughput capacity to the less-crowded area including the second set of UEs that are less than the first set of UEs, such as the second data throughput capacity is less than the first data throughput capacity. In this case, the first network node 104A itself may direct the beams. In addition, the dynamic allocation of the RF signals allows for targeted coverage, ensuring that each UE in both the crowded and the less-crowded areas receive adequate signal strength and network access.

In accordance with an embodiment, the controller 108 may be further configured to execute the on-demand load balancing using a trained AI model provided in the central cloud server 120. After the initial deployment of the wireless communication system 102, one or more network nodes (e.g., the first network node 104A and the second network node 104B) of the plurality of network nodes 104 may perform a dynamic mapping to comprehend the environment and the distribution of connected users (UEs). This data may be then sent to the central cloud sever 120. The AI model at the central cloud server 120 may be a deep neural network, which uses such data as training data and finds patterns of user movements and network usage, developing a predictive model for the evolving network environment. For instance, in a densely populated auditorium, the AI model learns the times of the day when certain areas experience higher user device activity. It recognizes that areas vacated at certain times may require less coverage and throughput. Based on these patterns and insights, the AI model becomes trained over time to predict and proactively control the plurality of network nodes 104 to execute the on-demand load balancing. In crowded areas, the central cloud server 120 using the trained AI model may direct one or more network nodes of the plurality of network nodes 104 directly or via the first network node 104A to focus more intense beams in crowded areas optimizing throughput to meet the heightened demand. Conversely, in less crowded areas that have been vacated or includes a few UEs, the service coverage may be reduced accordingly. This adaptive load balancing ensures that network resources may be efficiently allocated based on real-time user demands, leading to a more responsive and resource-effective wireless communication system 102. The integration of the trained AI model enables the network to dynamically adjust its parameters, enhancing overall performance and user experience.

Figure 2B:
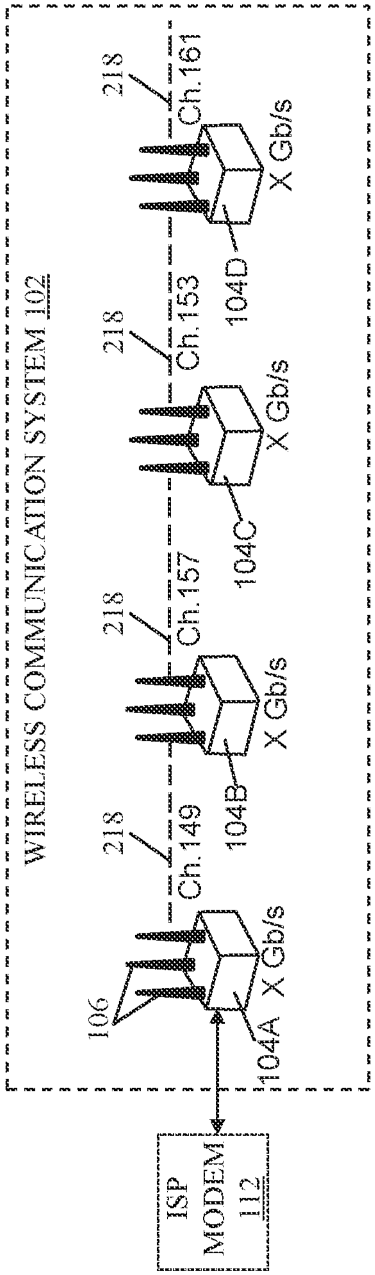
FIG. 2B is a block diagram illustrating a wireless communication system with a plurality of network nodes, in accordance with another exemplary embodiment of the disclosure.

FIG. 2B is a block diagram illustrating a wireless communication system with a plurality of network nodes, in accordance with an embodiment of the disclosure. FIG. 2B is explained in conjunction with elements from FIG. 1 and FIG. 2A. With reference to FIG. 2B, there is shown the wireless communication system 102 that includes the first network node 104A, the second network node 104B, a third network node 104C, and an Nth network node 104N. Furthermore, each network node may be configured to operate at a distinct frequency channel, such as a frequency channel 149, a frequency channel 153, a frequency channel 157, and a frequency channel 161. There is further shown that the first network node 104A is connected with the ISP modem 112.

In accordance with an embodiment, the controller 108 of the first network node 104A may be configured to receive the one or more signals from the ISP modem 112 (e.g., a radio modem). Thereafter, the controller 108 of the first network node 104A may be configured to segregate the first type of frames from the second type of frames. The first type of frames includes management frames and control frames while the second data frames may include data frames. In addition, the first type of frames may be wirelessly relayed from the first network node 104A to the one or more network nodes, such as the network nodes 104B, 1404C, and 104D) in a distinct frequency channel (e.g., ch. 149, ch. 157, ch. 153, ch. 161 as shown in an example) within the first frequency range (e.g., under sub-6 GHz). Similarly, the second type of frames may be wirelessly relayed towards one or more user equipment (UEs) directly or through the one or more other network nodes, such as the third network node 104C or the fourth network node 104D within the second frequency range (e.g., in mmWave frequency, such as 60 GHz).

Conventional Wi-Fi® Mesh utilizes one of existing access channels to communicate with the next node, which becomes part of a Collision Domain to extend the wireless range. This is the fundamental flaw of conventional Wi-Fi® Mesh, which gets exasperated by introducing more extending AP nodes. Beneficially, as compared to conventional approaches where throughput decreases as the number of nodes increases, in the present disclosure, the throughput of each network node may be same, such as 100 MHz or "X" gigabits per second (Gb/s) for each network node) as distinct frequency channel is used to communicate between each network nodes within the first frequency range, especially the first type of frames. As a result, each network node can support a maximum data rate, for example, in multigigabit data rate. Thus, the coverage of the first network node 104A may be extended without any penalties in speed, latency, or performance of the wireless communication system 102 in the wireless backhaul network 110.

In accordance with an embodiment, the controller 108 may be configured to schedule a concurrent uplink transmission and downlink transmission with the one or more network nodes through the one or more backhaul links 218 based on the assignment of the distinct frequency and the distinct time slot to each network node. In an example, the controller 108 of the first network node 104A may be configured to schedule the concurrent uplink transmission and the downlink transmission based on the TDM and OFDM to assign a distinct frequency and a distinct time slot to each slave network node for uplink transmission. In an implementation, the first network node 104A may be configured to schedule the first type of frames by using multilink orthogonal frequency division multiplexing (OFDM) for uplink (i.e., to the Internet) or downlink (i.e., from the Internet) direction, such as by using the array of antennas 106. Herein, the multilink OFDM enables the first network node 104A to communicate with one or more network nodes of the plurality of network nodes 104, such as by controlling the array of antennas 106 for utilizing three different frequencies for intra-network node communication (as shown by three different antennas). By virtue of using the Multilink OFDM, the first network node 104A, extends the range and accelerates the performance of the wireless backhaul network 110, potentially achieving speeds akin to a 2.5 or 5 Gbit/s with low latency and improved throughput. In an implementation, once the second type of frames are wirelessly relayed towards the third network node 104C, thereafter the third network node 104C may be configured to perform beamforming, such as to focus a mmWave signal in a specific direction. For example, either towards the fourth network node 104D, or towards the fifth network node 104E, which is beneficial to improve the range and performance of the wireless backhaul network 110.

Figure 3:
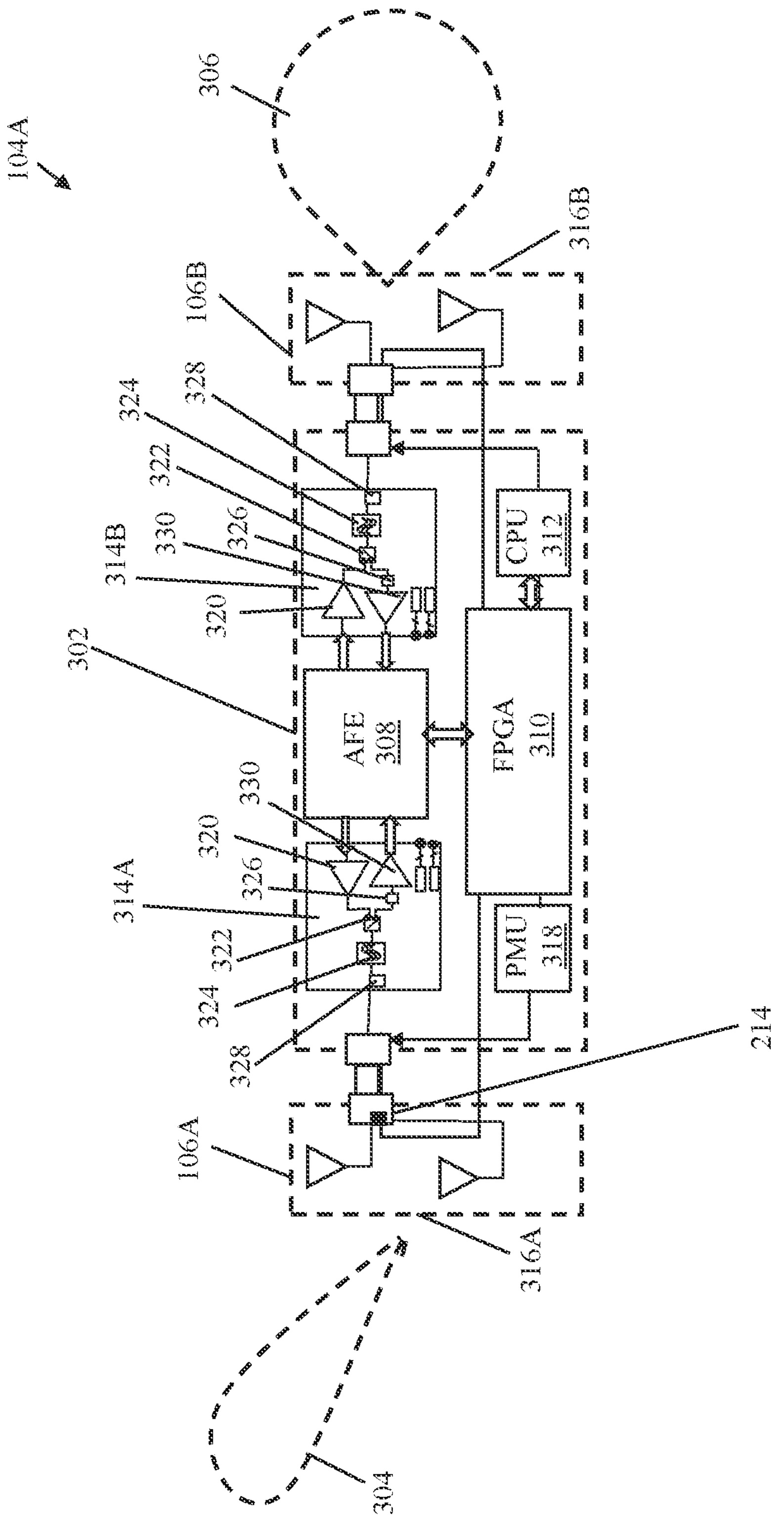
FIG. 3 is a diagram illustrating an exemplary first network node of a wireless communication system, in accordance with an exemplary embodiment of the disclosure.

FIG. 3 is a diagram illustrating an exemplary first network node of a wireless communication system, in accordance with an exemplary embodiment of the disclosure. FIG. 3 is explained in conjunction with elements from FIGS. 1, 2A, and 2B. With reference to FIG. 3, there is shown the first network node 104A with a repeater core 302. The first network node 104A may further include the first set of antennas 106A associated with a first beam of RF signals 304 and the second set of antennas associate with a second beam of RF signals 306.

In an implementation, the repeater core 302 may include an analog front-end (AFE) 308, a field programmable gate array (FPGA) 310, and a central processing unit (CPU) 312. In this case, the repeater core 302 may include two integrated RF front end components, such as two power amplifier modules integrated duplexer (PAMiDs) components 314A and 314B, each arranged at either side of the AFE 308 for a donor side 316A and service side 316B operations of the first network node 104A. The repeater core 302 may further include a phasor measurement unit (PMU) component 318. Each PAMiD component 314A and 314B may include a power amplifier (PA) 320 connected to a transmit-receive switch (Tx-Rx SW) 322. The Tx-Rx SW 322 may be used to switch the PA 320 between transmit and receive modes. In each PAMiD component 314A and 314B, there is further shown a bandpass filter (BPF) 324 and a high-pass filter (HPF) 326 both connected to the Tx-Rx SW 322. The BPF 324 may be further connected to a coupling (CPL) Component 328. The HPF 326 may be coupled to a low noise amplifier (LNA) 330.

In accordance with an embodiment, the AFE 308 may be an interface between the analogue RF signal and the digital processing components of the repeater core 302. The AFE 308 may receive the signal from the PAMiD component 314A or 314B, may filter and digitize it, and then may send it to the FPGA 310 and the CPU 312 (collectively may function as the controller 108) for further processing.

In accordance with an embodiment, the FPGA 310 may be a programmable integrated circuit that allows for the customization of the digital signal processing operations (or algorithms) used in the repeater core 302. The FPGA 310 along with the CPU 312 (collectively referred to as the controller 108) may be used to control the operation of the various components in the repeater core 302 and for managing the flow of signals through the wireless communication system 102.

In accordance with an embodiment, each PAMiD component 314A and 314B may include the PA 320 that may amplify the signal power while the duplexer comprising of filters, Tx-Rx switches, and coupler allows for the simultaneous transmission and reception of the signal. The flow of signals through the repeater core 302 may involve the captured RF signal from at least one of the plurality of different configurations of the array of antennas 106 at the donor side 316A being received and filtered by various components in the PAMiD component 314A. In the PAMiD component 314A, the signal after filtering may pass to the LNA 330 that may amplify the signal without adding additional noise before the signal is sent to the AFE 308 for processing. The signal may then be digitized by the AFE 308 (e.g., using an analogue to digital converter), processed by the controller 108 (e.g., a digital signal processor, such as the FPGA 310 along with the CPU 312), passed back to the AFE 308 and transmitted back out through the PAMiD component 314B (with signal amplification and filtering or without amplification in some case) to the plurality of service antennas at the service side 316B.

In accordance with an embodiment, the Tx-Rx SW 322 may be used to switch between transmitting and receiving modes and may be used in conjunction with the PA 320. The BPF 324 may be configured to filter out unwanted signals that are outside of the frequency range of interest, for example, outside C-band, to reduce noise and interference. The HPF 326 may be configured to filter out low-frequency signal to prevent low-frequency noise and interference from being amplified. The CPL component 328 may be used to couple the signal from the BPF 324 to the AFE 308 so that the filtered and amplified signal may be properly sent to the AFE 308. The LNA 330 may amplify the signal without adding additional noise before the signal is sent to the AFE 308 for processing.

Figure 4A:
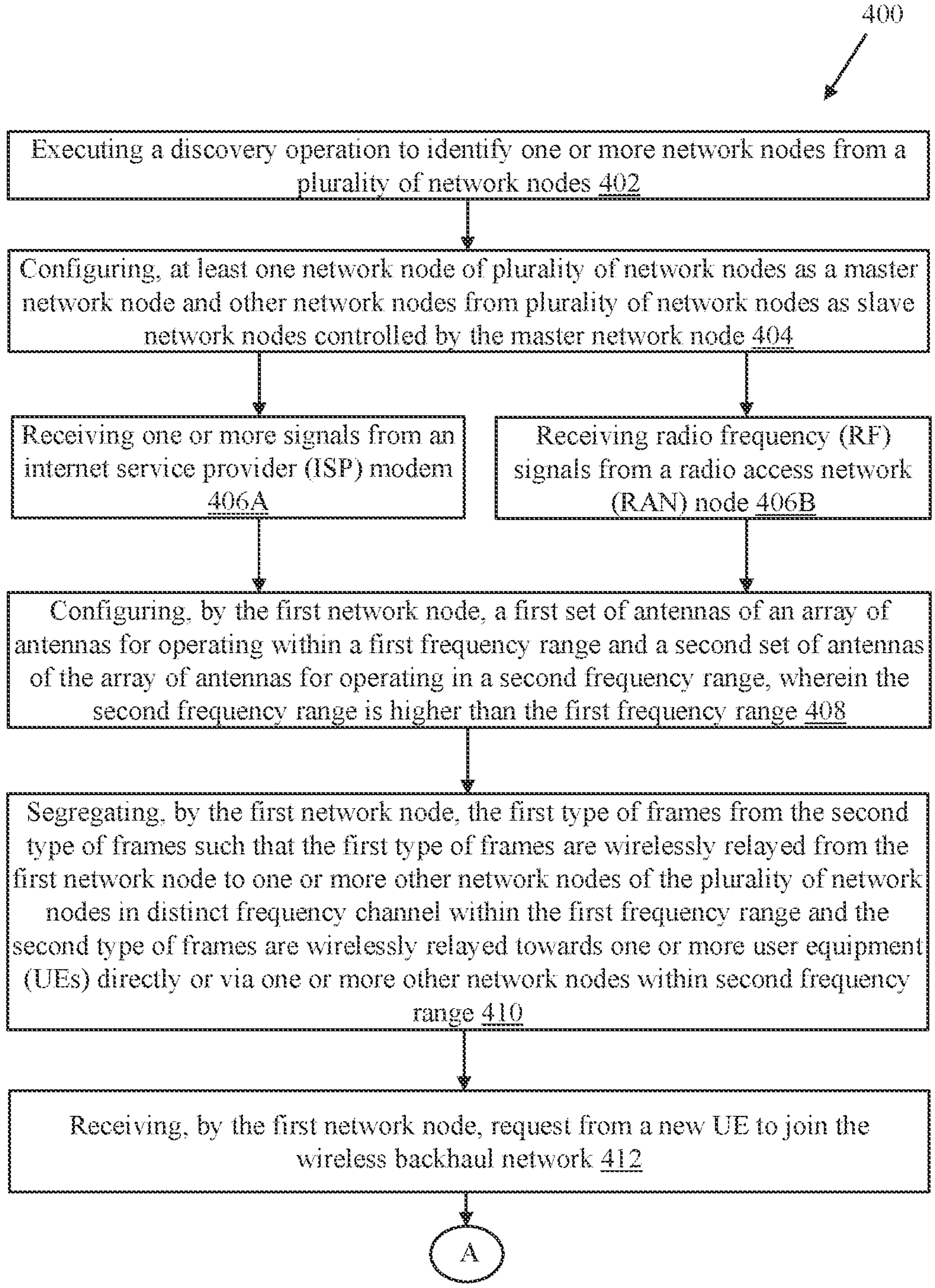
FIGS. 4A, 4B, and 4C collectively is a diagram illustrating a flow chart of an exemplary method for operating a wireless communication system as high-performance wireless backhaul network, in accordance with another exemplary embodiment of the disclosure.
Figure 4B:
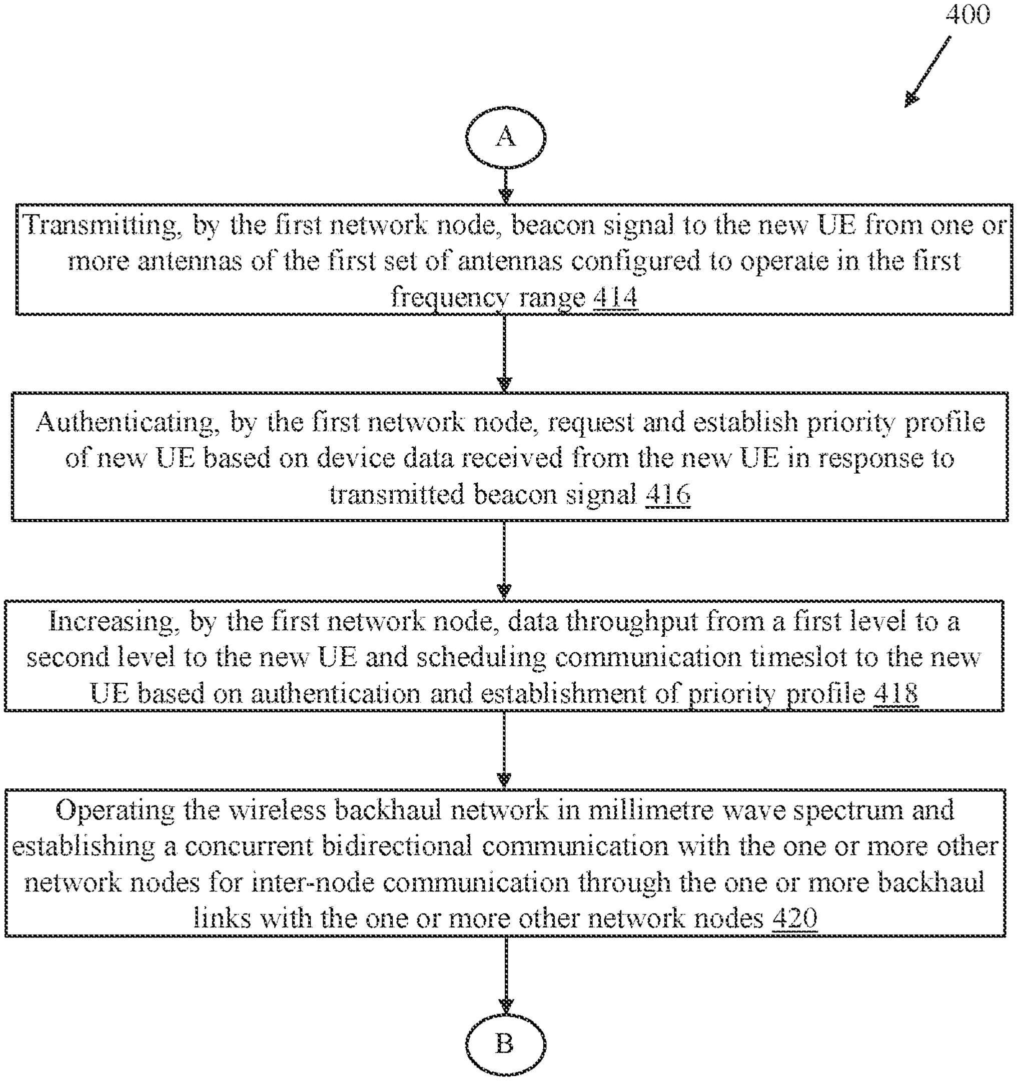
Figure 4C:
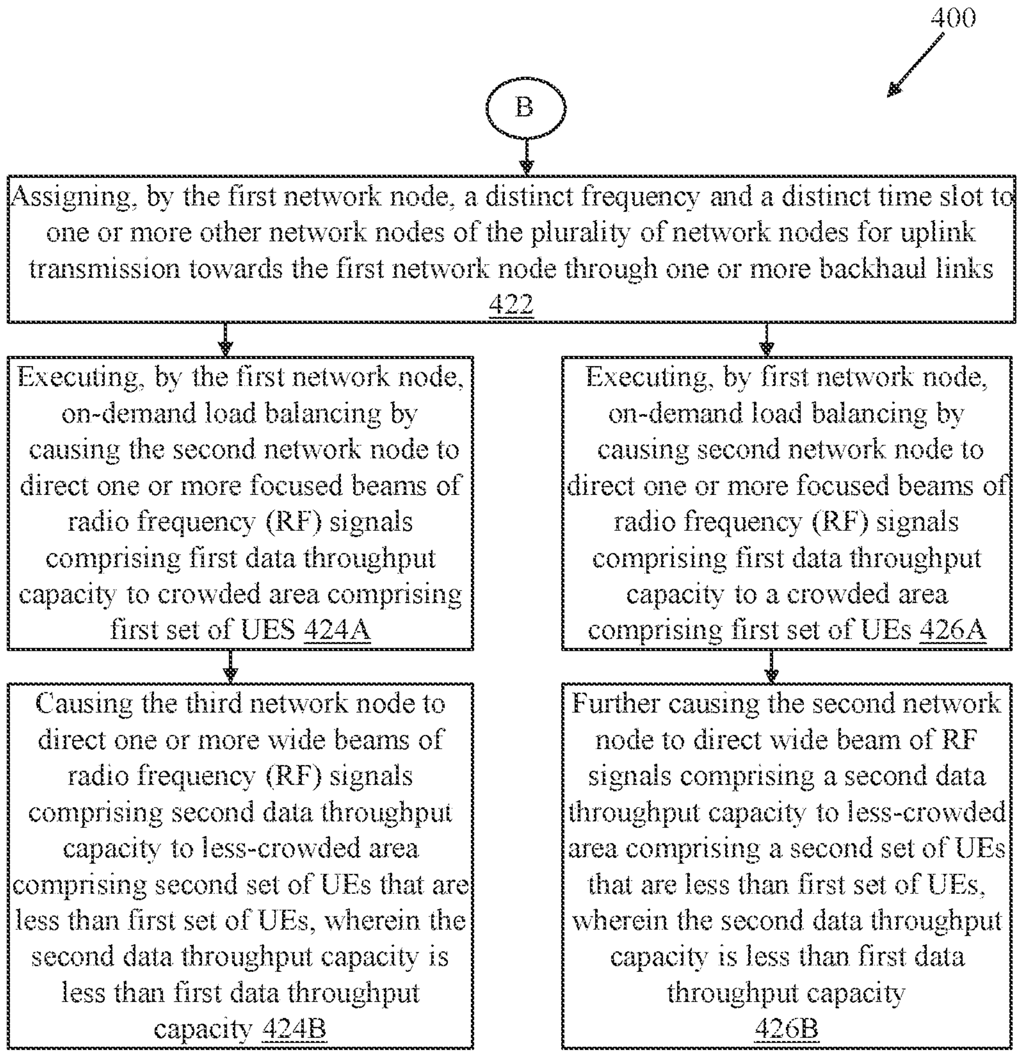

FIGS. 4A, 4B, 4C collectively is a diagram illustrating a flow chart of an exemplary method for operating a wireless communication system as a high-performance wireless backhaul network, in accordance with an embodiment of the disclosure. FIGS. 4A, 4B, and 4C are explained in conjunction with elements from FIGS. 1, 2A, 2B, and 3. With reference to FIGS. 4A, 4B, and 4C, there is shown a method 400 for operating the wireless communication system 102. The method 400 includes steps from 402 to 424.

At 402, a discovery operation may be executed to identify one or more network nodes of the plurality of network nodes 104. The first network node 104A in cooperation with other network nodes of the plurality of network nodes 104 may be configured to form a wireless mesh network or a wireless chain network by establishing connection with one or more neighboring nodes based on the discovery operation.

At 404, at least one network node of the plurality of network nodes 104 may be configured as a master network node and other network nodes of the plurality of network nodes 104 may be configured as slave network nodes controlled by the master network node. For example, the first network node 104A may be configured to act as the master network node and may be connected to the wireless backhaul network 110. The control may pass to either 406A or 406B.

At 406A, one or more signals may be received from the ISP modem 112. Alternatively, at 406B, radio frequency (RF) signals may be received from the RAN node 220 (e.g., a small cell or a gNB), such as from the first base station 116A or from the second base station 116B.

At 408, the first set of antennas 106A of the array of antennas 106 may be configured to operate within a first frequency range and a second set of antennas 106B of the array of antennas 106 may be configured to operate in a second frequency range. The second frequency range (e.g., in mmWave range, such as 60 GHz) may be higher than the first frequency range (under sub-6 GHz, such as may operate in three resonating frequencies 2.4, 5, and 6 GHz). Furthermore, the wireless communication system 102 may allow concurrent operation of the first set of antennas 106A and the second set of antennas 106B at different frequency ranges, offering flexibility for diverse wireless communication scenarios.

At 410, the first type of frames may be segregated from the second type of frames such that the first type of frames may be wirelessly relayed from the first network node 104A to one or more other network nodes of the plurality of network nodes 104 in a distinct frequency channel within the first frequency range and the second type of frames are wirelessly relayed from the first network node 104A towards one or more user equipment (UEs) directly or via the one or more other network nodes within the second frequency range. As a result, the management frames or the control frames may be separated from the data frames.

At 412, a request may be received from new UE by the first network node 104A to join the wireless backhaul network 110.

At 414, a beacon signal may be transmitted to the new UE by the first network node 104A from one or more antennas of the first set of antennas 106A configured to operate in first frequency range. When the new UE is trying to join the wireless backhaul network 110, then the lower frequency channels may be used to transmit the beacon signal from the first network node 104A to the new UE. In an example, the beacon signal is transmitted in a separate collision domain, which is different from inter-node communication.

At 416, the request may be authenticated and a priority profile of the new UE may be established by the first network node 104A based on device data received from the new UE in response to transmitted beacon signal. Beneficially as compared to conventional approaches, this ensures seamless and disruption-free communication within the wireless backhaul network 110, especially for new UE connections, by allocating lower frequency channels for initial synchronization and data transfer scheduling. This significantly reduces the potential for contention and collisions, improving overall network reliability and performance.

At 418, a data throughput may be increased by the first network node 104A from a first level to a second level to the new UE and a communication timeslot may be scheduled to the new UE based on the authentication and establishment of the priority profile. In an implementation, once the new UE is qualified by the first network node 104A at a lower frequency and a priority profile is established, then the first network node 104A may intelligently determine to increase the level of data throughput, such as from the first level to the second level. The controller 108 may be further configured to schedule a communication timeslot, due to which the first network node 104A and the new UE can schedule and expect a synchronized data transfer window to avoid contention and collision.

At 420, the wireless backhaul network 110 may be operated in a mmWave spectrum and a concurrent bidirectional communication may be established with the one or more other network nodes for inter-node communication through one or more backhaul links 218 with the one or more other network nodes.

At 422, a distinct frequency and a distinct time slot may be assigned by the first network node 104A to the one or more other network nodes of the plurality of network nodes 104 for uplink transmission towards the first network node through one or more backhaul links 218. The control may then pass to 424A or 426A.

At 424A, an on-demand load balancing may be executed by the first network node 104A by causing the second network node 104B to direct one or more focused beams of radio frequency (RF) signals including a first data throughput capacity to a crowded area comprising a first set of UEs.

At 424B, the third network node 104C may be caused (by the first network node 104A) to direct one or more wide beams of radio frequency (RF) signals including a second data throughput capacity to a less-crowded area including a second set of UEs that are less than the first set of UEs. The second data throughput capacity may be less than the first data throughput capacity.

At 426A, an on-demand load balancing may be executed by the first network node 104A by causing the second network node 104B to direct one or more focused beams of radio frequency (RF) signals including a first data throughput capacity to a crowded area including a first set of UEs.

At 426B, the second network node may be further caused to direct a wide beam of RF signals including a second data throughput capacity to a less-crowded area including a second set of UEs that are less than the first set of UEs. This on-demand load balancing approach may lead to improved user experiences in crowded areas and resource optimization in less-crowded zones, enhancing the overall network performance.

Various embodiments of the disclosure may provide a non-transitory computer-readable medium having stored thereon computer implemented instructions that when executed by a computer causes a wireless communication system 102 to execute operations, the operations comprising configuring, by the first network node 104A, a first set of antennas of the array of antennas 106 for operating within a first frequency range and a second set of antennas of the array of antennas 106 for operating in a second frequency range, where the second frequency range is higher than the first frequency range; and segregating, by the first network node 104A, a first type of frames from a second type of frames such that the first type of frames are wirelessly relayed from the first network node 104A to one or more other network nodes of the plurality of network nodes 104 in a different frequency channel within the first frequency range and the second type of frames are wirelessly relayed towards one or more user equipment (UEs) 114 directly or via the one or more other network nodes within the second frequency range. The first type of frames may comprise management frames or control frames and the second type of frame may comprise user data frames.

While various embodiments described in the present disclosure have been described above, it should be understood that they have been presented by way of example, and not limitation. It is to be understood that various changes in form and detail can be made therein without departing from the scope of the present disclosure. In addition to using hardware (e.g., within or coupled to a central processing unit ("CPU"), microprocessor, micro controller, digital signal processor, processor core, system on chip ("SOC") or any other device), implementations may also be embodied in software (e.g., computer readable code, program code, and/or instructions disposed in any form, such as source, object, or machine language) disposed for example in a non-transitory computer-readable medium configured to store the software. Such software can enable, for example, the function, fabrication, modeling, simulation, description and/or testing of the apparatus and methods describe herein. For example, this can be accomplished through the use of general program languages (e.g., C, C++), hardware description languages (HDL) including Verilog HDL, VHDL, and so on, or other available programs. Such software can be disposed in any known non-transitory computer-readable medium, such as semiconductor, magnetic disc, or optical disc (e.g., CD-ROM, DVD-ROM, etc.). The software can also be disposed as computer data embodied in a non-transitory computer-readable transmission medium (e.g., solid state memory any other non-transitory medium including digital, optical, analog-based medium, such as removable storage media). Embodiments of the present disclosure may include methods of providing the apparatus described herein by providing software describing the apparatus and subsequently transmitting the software as a computer data signal over a communication network including the internet and intranets.

It is to be further understood that the system described herein may be included in a semiconductor intellectual property core, such as a microprocessor core (e.g., embodied in HDL) and transformed to hardware in the production of integrated circuits. Additionally, the system described herein may be embodied as a combination of hardware and software. Thus, the present disclosure should not be limited by any of the above-described exemplary embodiments but should be defined only in accordance with the following claims and their equivalents.

What is claimed is:

1. A wireless communication system, comprising:

a plurality of network nodes distributed at different locations in a wireless backhaul network, wherein a first network node of the plurality of network nodes comprises:

an array of antennas configured for uplink and downlink transmission; and a controller configured to:

configure a first set of antennas of the array of antennas to operate within a first frequency range and a second set of antennas of the array of antennas to operate in a second frequency range, wherein the second frequency range is higher than the first frequency range;

segregate a first type of frames from a second type of frames such that the first type of frames are wirelessly relayed from the first network node to one or more other network nodes of the plurality of network nodes in a distinct frequency channel within the first frequency range and the second type of frames are wirelessly relayed towards one or more user equipment (UEs) directly or via the one or more other network nodes within the second frequency range, wherein the first type of frames comprises management frames or control frames and the second type of frames comprises user data frames, receive a request from a new UE to join the wireless backhaul network;

transmit a beacon signal to the new UE from one or more antennas of the first set of antennas configured to operate in the first frequency range; and authenticate the request and establish a priority profile of the new UE based on device data received from the new UE in response to the transmitted beacon signal.

2. The wireless communication system according to claim 1, wherein the controller is further configured to increase a data throughput from a first level to a second level to the new UE and schedule a communication timeslot to the new UE based on the authentication and establishment of the priority profile.

3. The wireless communication system according to claim 1, wherein the relay of the first type of frames and the second type of frames from the first network node to the one or more other network nodes of the plurality of network nodes is in a chain network configuration or a mesh network configuration.

4. The wireless communication system according to claim 1, wherein the wireless backhaul network formed by the plurality of network nodes operates in a millimeter wave spectrum and the controller is configured to establish a concurrent bidirectional communication with the one or more other network nodes for inter-node communication through one or more backhaul links with the one or more other network nodes.

5. The wireless communication system according to claim 1, wherein the wireless backhaul network is formed by the plurality of network nodes as a distinct network loop isolated from other network traffic corresponding to fronthaul access.

6. The wireless communication system according to claim 1, wherein at least one network node of the plurality of network nodes act as a master network node and other network nodes from the plurality of network nodes acts as slave network nodes controlled by the master network node.

7. The wireless communication system according to claim 6, wherein when the first network node is the master network node, the controller is further configured to assign a distinct frequency and a distinct time slot to each slave network node of the slave network nodes for uplink transmission towards the master network node through one or more backhaul links.

8. The wireless communication system according to claim 7, wherein the controller is further configured schedule a concurrent uplink transmission and downlink transmission with the slave network nodes through the one or more backhaul links based on the assignment of the distinct frequency and the distinct time slot to each slave network node of the slave network nodes.

9. The wireless communication system according to claim 1, wherein the controller is further configured to:

cause a second network node to direct one or more focused beams of radio frequency (RF) signals comprising a first data throughput capacity to a crowded area comprising a first set of UEs to execute an on-demand load balancing; and further cause a third network node to direct one or more wide beams of radio frequency (RF) signals comprising a second data throughput capacity to a less-crowded area comprising a second set of UEs that are less than the first set of UEs to execute the on-demand load balancing, wherein the second data throughput capacity is less than the first data throughput capacity.

10. The wireless communication system according to claim 1, wherein the controller is further configured to:

cause a second network node to direct one or more focused beams of radio frequency (RF) signals comprising a first data throughput capacity to a crowded area comprising a first set of UEs to execute an on-demand load balancing; and further cause the second network node to direct a wide beam of RF signals comprising a second data throughput capacity to a less-crowded area comprising a second set of UEs that are less than the first set of UEs to execute the on-demand load balancing, wherein the second data throughput capacity is less than the first data throughput capacity.

11. The wireless communication system according to claim 1, wherein the controller is further configured to:

direct one or more focused beams of radio frequency (RF) signals comprising a first data throughput capacity to a crowded area comprising a first set of UEs; and direct a wide beam of RF signals comprising a second data throughput capacity to a less-crowded area comprising a second set of UEs that are less than the first set of UEs, wherein the second data throughput capacity is less than the first data throughput capacity.

12. The wireless communication system according to claim 1, wherein each of the plurality of network nodes is one of: a repeater device, a relay device, a wireless access point, or a combination thereof.

13. A method for operating a wireless communication system comprising a plurality of network nodes in a wireless backhaul network, the method comprising:

configuring, by a first network node, a first set of antennas of an array of antennas for operating within a first frequency range and a second set of antennas of an array of antennas for operating in a second frequency range, wherein the second frequency range is higher than the first frequency range;

segregating, by the first network node, a first type of frames from a second type of frames such that the first type of frames are wirelessly relayed from the first network node to one or more other network nodes of the plurality of network nodes in a distinct frequency channel within the first frequency range and the second type of frames are wirelessly relayed towards one or more user equipment (UEs) directly or via the one or more other network nodes within the second frequency range, wherein the first type of frames comprises management frames or control frames and the second type of frame comprises user data frames, receiving, by the first network node, a request from a new UE to join the wireless backhaul network;

transmitting, by the first network node, a beacon signal to the new UE from one or more antennas of the first set of antennas configured to operate in the first frequency range; and authenticating, by the first network node, the request and establish a priority profile of the new UE based on device data received from the new UE in response to the transmitted beacon signal.

14. The method according to claim 13, further comprising increasing, by the first network node, a data throughput from a first level to a second level to the new UE and scheduling a communication timeslot to the new UE based on the authentication and establishment of the priority profile.

15. The method according to claim 13, further comprising operating the wireless backhaul network in a millimeter wave spectrum and establishing a concurrent bidirectional communication with the one or more other network nodes for inter-node communication through one or more backhaul links with the one or more other network nodes.

16. The method according to claim 13, further comprising assigning, by the first network node, a distinct frequency and a distinct time slot to the one or more other network nodes of the plurality of network nodes for uplink transmission towards the first network node through one or more backhaul links.

17. The method according to claim 13, further comprising executing, by the first network node, an on-demand load balancing by:

causing a second network node to direct one or more focused beams of radio frequency (RF) signals comprising a first data throughput capacity to a crowded area comprising a first set of UEs; and causing a third network node to direct one or more wide beams of radio frequency (RF) signals comprising a second data throughput capacity to a less-crowded area comprising a second set of UEs that are less than the first set of UEs, wherein the second data throughput capacity is less than the first data throughput capacity.

18. The method according to claim 13, further comprising executing, by the first network node, an on-demand load balancing by:

causing a second network node to direct one or more focused beams of radio frequency (RF) signals comprising a first data throughput capacity to a crowded area comprising a first set of UEs; and further causing the second network node to direct a wide beam of RF signals comprising a second data throughput capacity to a less-crowded area comprising a second set of UEs that are less than the first set of UEs, wherein the second data throughput capacity is less than the first data throughput capacity.

* * * * *